US010215657B2

(12) United States Patent
Straitiff et al.

(10) Patent No.: US 10,215,657 B2
(45) Date of Patent: Feb. 26, 2019

(54) AUTOMATED BALANCE-WEIGHT APPLICATOR

(71) Applicant: Android Industries LLC, Auburn Hills, MI (US)

(72) Inventors: Donald Graham Straitiff, Howell, MI (US); Barry Allan Clark, Ortonville, MI (US); David Henry Larson, Swartz Creek, MI (US); Daniel David Larson, Swartz Creek, MI (US); Kyle John Swinter, Birmingham, MI (US); Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 296 days.

(21) Appl. No.: 15/085,589

(22) Filed: Mar. 30, 2016

(65) Prior Publication Data

US 2016/0290885 A1   Oct. 6, 2016

Related U.S. Application Data

(60) Provisional application No. 62/140,263, filed on Mar. 30, 2015.

(51) Int. Cl.
| | |
|---|---|
| G01M 1/00 | (2006.01) |
| G01M 1/02 | (2006.01) |
| B32B 37/00 | (2006.01) |
| F16F 15/32 | (2006.01) |
| B32B 38/00 | (2006.01) |

(Continued)

(52) U.S. Cl.
CPC .......... *G01M 1/02* (2013.01); *B32B 37/0053* (2013.01); *B32B 38/0004* (2013.01); *B32B 38/1866* (2013.01); *F16F 15/324* (2013.01); *F16F 15/328* (2013.01); *F16F 2226/042* (2013.01); *F16F 2230/0011* (2013.01); *G01M 1/326* (2013.01); *Y10T 156/1062* (2015.01); *Y10T 156/1085* (2015.01)

(58) Field of Classification Search
CPC ......................... G01M 1/326; F16F 2226/042
See application file for complete search history.

(56) References Cited

U.S. PATENT DOCUMENTS

| | | | | |
|---|---|---|---|---|
| 4,106,964 | A | * | 8/1978 | DeVittorio ............ F16F 15/324 118/302 |
| 7,448,267 | B2 | * | 11/2008 | Williams .............. G01M 1/045 73/462 |

(Continued)

*Primary Examiner* — Linda L Gray
(74) *Attorney, Agent, or Firm* — HONIGMAN LLP

(57) ABSTRACT

A weight applicator system includes a shaft, an applicator assembly, and a weight feed assembly. The shaft defines a length between a proximal end and a distal end configured to support a wheel-tire assembly for common rotation about a longitudinal axis of the shaft. The applicator assembly is supported by the shaft and includes a base portion disposed upon the shaft and operable to translate axially along the length of the shaft, a radial portion connected to the base portion and operable to radially move relative to the base portion between a retracted position and an extended position; and a pressure roller rotatably supported by the radial portion about an axis of rotation. The weight feed assembly is operable to feed a prescribed length of weighted material to the pressure roller.

16 Claims, 14 Drawing Sheets

(51) Int. Cl.
G01M 1/32 (2006.01)
B32B 38/18 (2006.01)

(56) References Cited

U.S. PATENT DOCUMENTS 8,943,940 B2 * 2/2015 Hedtke, Jr. .............. B26D 5/20
83/809
2010/0147458 A1 * 6/2010 Donnay ................ F16F 15/324
156/281
2014/0367050 A1 * 12/2014 Burgel .................... F16F 15/32
156/719

* cited by examiner

AUTOMATED BALANCE-WEIGHT APPLICATOR

CROSS-REFERENCE TO RELATED APPLICATIONS

This U.S. Patent Application claims priority to U.S. Provisional Application 62/140,263 filed on Mar. 30, 2015, the disclosure of which is considered part of the disclosure of this application and is hereby incorporated by reference in its entirety.

TECHNICAL FIELD

This disclosure relates to balancing wheel-tire assemblies, and more particularly to an automated system for applying a weighted material to a wheel of a wheel-tire assembly.

BACKGROUND

Wheel-tire assemblies support vehicles upon a ground surface and permit vehicles to move relative to the ground surface when the wheel-tire assemblies rotate. Rotation at higher rates of speed may evidence an imbalance in weight, resulting in vibration that can lead to increased wear upon vehicle components as well as reducing ride quality perceived by vehicle drivers. Generally, wheel-tire assemblies undergo a balancing process that uses a balancing machine to spin each wheel-tire assembly to determine areas or locations requiring the addition of weighted segments to provide a balanced weight distribution across the wheel-tire assemblies.

Lead pound-on weights are known type of weighted segment for attaching to a rim of a rimmed wheel and may include many different calibrated weight increments for use when balancing wheel-tire assemblies. A facility attaching these lead weights wheels may inadvertently mix the weights and end up attaching an incorrect weight for a given wheel-tire assembly. Moreover, the use iron pound-on weights in place of lead pound-on weights to alleviate lead toxicity concerns may result in the iron rusting over time during use of the tire-wheel assembly by the vehicle.

SUMMARY

A weight applicator system includes a shaft, an applicator assembly, and a weight feed assembly. The shaft defines a length between a proximal end and a distal end configured to support a wheel-tire assembly for common rotation about a longitudinal axis of the shaft. The applicator assembly is supported by the shaft and includes a base portion disposed upon the shaft and operable to translate axially along the length of the shaft, a radial portion connected to the base portion and operable to radially move relative to the base portion between a retracted position and an extended position; and a pressure roller rotatably supported by the radial portion about an axis of rotation. The weight feed assembly is operable to feed a prescribed length of weighted material to the pressure roller. The weight applicator system also includes a processor in communication with the shaft, the applicator assembly, and the weight feed assembly. The processor is operable to control the pressure roller to apply the prescribed length of weighted material fed from the weight feed assembly to a specified location upon the wheel-tire assembly.

Implementations of the disclosure may include one or more of the following optional features. In some implementations, the proximal end of the shaft is operably connected to a shaft motor in communication with the processor and the processor is operable to control the shaft motor to rotate the shaft about the longitudinal axis when the pressure roller applies the prescribed length of the weighted material to the specified location upon the wheel-tire assembly.

In some examples, the weight applicator system also includes an axial actuator in communication with the processor and the base portion of the applicator assembly, a radial actuator in communication with the processor and the radial portion of the applicator assembly, and a drive motor in communication with the processor and the pressure roller. In these examples, the axial actuator is operable to translate the base portion axially along the length of the shaft in a first direction to axially align the pressure roller with the specified location of the wheel-tire assembly, the radial actuator is operative to radially move the radial portion outward from the base portion when the pressure roller is axially assigned with the specified location of the wheel-tire assembly to press the weighted material against, and the drive motor is operative to rotate the pressure roller about the axis of rotation when the pressure roller receives the prescribed length of the weighted material from the weight feed assembly and when the pressure roller applies the prescribed length of the weighted material to the wheel-tire assembly at the specified location.

In some implementations, the weight feed assembly includes a dispenser operative to advance a strip of the weighted material stored in a roll in a direction toward the pressure roller, and a cutter operative to cut the strip of the weighted material into a segment associated with the prescribed length of the weighted material. In some examples, the dispenser includes a cylinder, a linear actuator operable to linearly translate in a first direction away from the cylinder during a power stroke within the cylinder and in an opposite second direction toward the cylinder, and a ratchet mechanism associated with the linear actuator and configured to engage with a portion of the length of the weighted material when the linear actuator translates in the first direction and disengage from the weighted material when the linear actuator translates in the second direction. In other examples, the dispenser includes a spool configured to hold a roll of the weighted material, a take-up roller operatively coupled to the spool, and a rotational actuator operative to rotate the take-up roller to cause the weighted material to unwind from the spool and advance toward the applicator assembly.

In some configurations, the weight applicator system also includes a take-up roller associated with the weight feed assembly and operative to remove a backing from the weighted material to expose an adhesive material applied to the weighted material prior to the weight feed assembly feeding the weighted material to the pressure roller. The adhesive material may configured to attach the prescribed length of the weighted material to the wheel-tire assembly at the specified location. In some examples, the specified location of the wheel-tire assembly includes a flange extending from one of a rear face or a front face of the wheel. In other examples, the specified location of the wheel-tire assembly includes an inner diameter of a radial wall of the wheel that extends between a front face and a rear face of the wheel and circumscribes a central cavity.

The weighted material may include a continuous strip of high-density weight material having a substantially uniform cross-section. The weighted material may define a rope-shaped cross-section or a ribbon-shaped cross-section. In some examples, the axis of rotation of the pressure roller and the longitudinal axis of the shaft are convergent in a direction extending toward the distal end of the shaft. In other examples, the axis of rotation of the pressure roller extends in a direction substantially parallel to the longitudinal axis of the shaft.

Another aspect of the disclosure provides a weight applicator system including a shaft, a first pressure roller, a first dispenser, a first cutter, and a processor in communication with the first pressure roller. The shaft defines a length extending between a proximal end and a distal end configured to support a wheel for common rotation about a longitudinal axis of the shaft. The first pressure roller is movably supported by the shaft and rotatable about a first axis of rotation, the first dispenser is operative to advance a strip of weighted material onto the pressure roller, and the first cutter is operative to cut the strip of the weighted material into a segment having a first prescribed length. The processor is operative to control the first pressure roller to move relative to the shaft and apply the prescribed length of the weighted material to the wheel at a first specified location.

In some implementations, the processor controls the first pressure roller to axially move relative to the shaft in a first direction toward the distal end of the shaft until the pressure roller is axially aligned with the specified location of the wheel. Additionally, the processor may control the first pressure roller to radially move relative to the shaft in an outward direction to press the prescribed length of the weighted material against the wheel at the first specified location when the pressure roller is axially aligned with the first specified location of the wheel.

In some implementation, the weight applicator system also includes a second pressure roller movably supported by the shaft and rotatable about a second axis of rotation, the second pressure roller axially disposed between the distal end of the shaft and the first pressure roller. In these implementations, the processor is in communication with the second pressure roller and is operative to control the second pressure roller to move relative to the shaft and apply a second prescribed length of the weighted material to the wheel at a second specified location. In some examples, the first axis of rotation, the second axis of rotation, and the longitudinal axis of the shaft are convergent with one another in a direction extending toward the distal end of the shaft.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
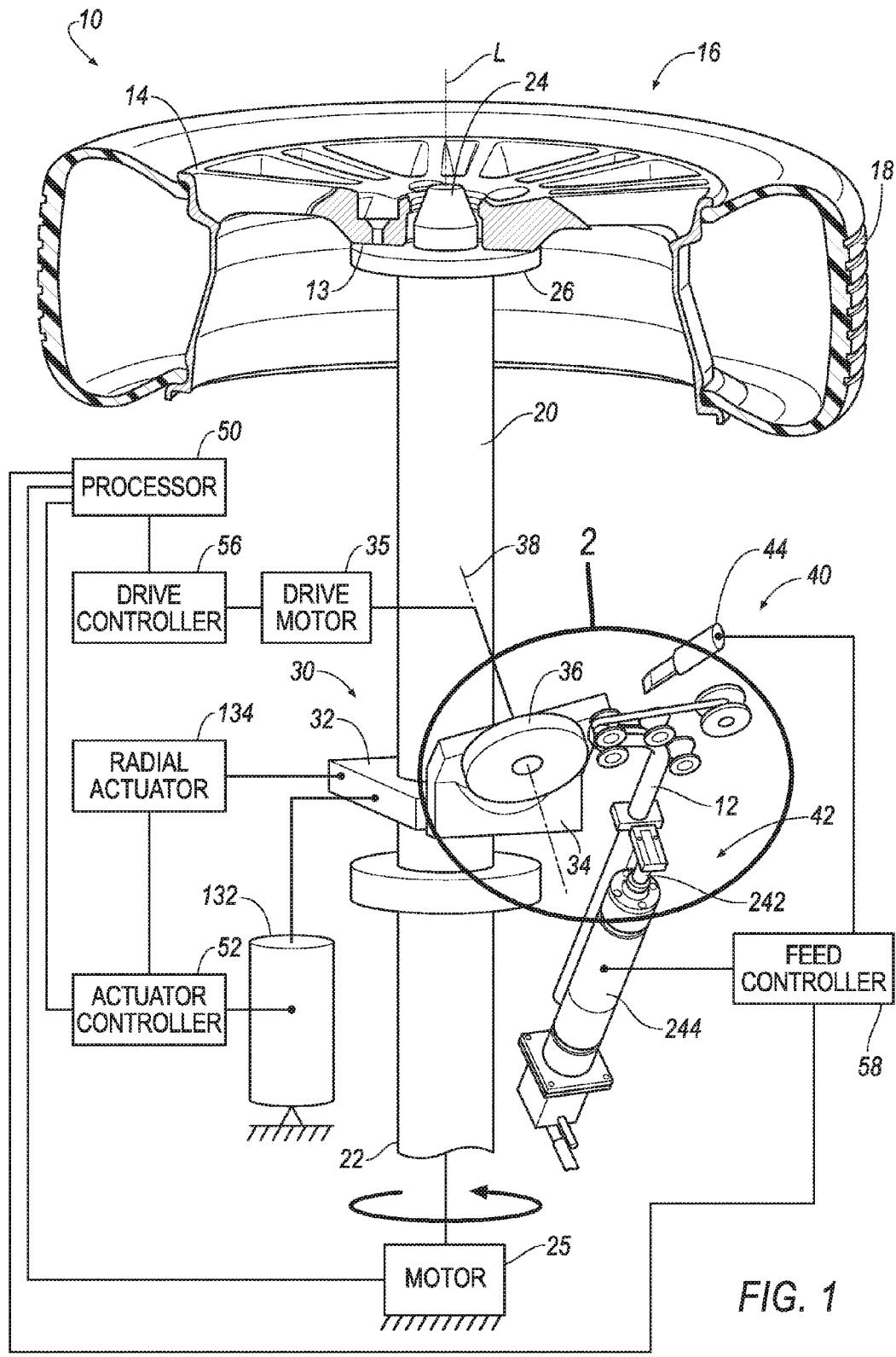
FIG. 1 is an isometric cross-sectional view of an example weight applicator system having a weight feed assembly and an applicator assembly for applying a weighted material to a wheel-tire assembly.

Referring to FIGS. 1-9, in some implementations, a weight applicator system 10 applies a weighted material 12 to a wheel 14 of a wheel-tire assembly 16 that includes the wheel 14 and a tire 18 joined around the wheel 14. The weight applicator system 10 includes a shaft 20, an applicator assembly 30 supported by the shaft 20, a weight feed assembly 40 operative to provide the weighted material 12 to the applicator assembly 30, and a processor 50 in communication with the applicator assembly 30 and the weight feed assembly 40.

The shaft 20 defines a length extending along a longitudinal axis L between a proximal end 22 operatively connected to a shaft motor 25 and a distal end 24. A wheel support member 26 may extend radially around a circumference of the shaft 20 at a location axially displaced from the distal end 24 and support the wheel-tire assembly 16. For example, the distal end 24 of the shaft 20 may at least partially extend through a central opening of the wheel-tire assembly 16 and the wheel support member 26 may oppose and engage with a hub surface 13 of the wheel 14 to support the wheel-tire assembly 16 upon the shaft 20 such that the wheel-tire assembly 16 is coaxial with the longitudinal axis L. In some examples, the wheel 14 is releasably fastened to the wheel support member 26 to couple the wheel-tire assembly 16 for common rotation with the shaft 20 about the longitudinal axis L. For instance, fasteners (e.g., lug nuts) may be used to releasably fasten the wheel 14 to the wheel support member 26. In some configurations, the processor 50 is operative to control the shaft motor 25 from an OFF state to an ON state that causes the shaft motor 25 to rotate the shaft 20 about the longitudinal axis L. Here, rotation by the shaft 20 causes the wheel-tire assembly 16 to also rotate about the longitudinal axis L when the wheel-tire assembly 16 is coupled for common rotation with the wheel support member 26.

In some implementations, the applicator assembly 30 includes a base portion 32, a radial portion 34, and a pressure roller 36 rotatably supported by the radial portion 34. The base portion 32 is disposed upon the shaft 20 between the proximal end 22 and the distal end 24 and may translate axially along the length of the shaft 20. In some examples, an axial actuator 132 axially moves the base portion 32 along the length of the shaft 20 in a first direction toward the wheel-tire assembly 16 at the distal end 24 of the shaft 20 and in an opposite second direction away from the wheel-tire assembly 16 and toward the proximal end 24 of the shaft 20. Here, an actuator controller 52 may be in communication with the axial actuator 132 to control the axial position of the base portion 32 relative to the shaft 20. The processor 50 may have supervisory control over the actuator controller 52.

Figure 7:
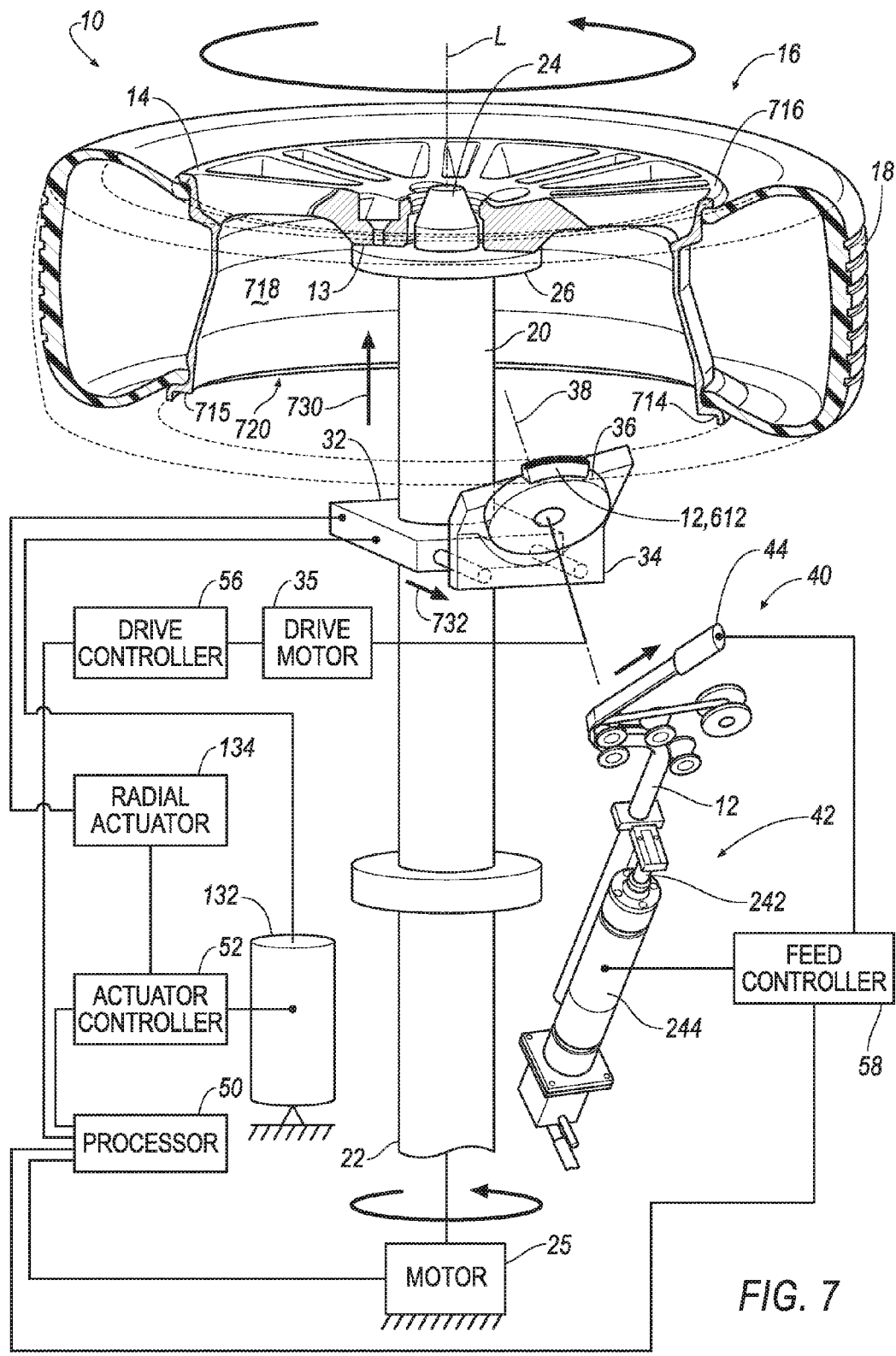
FIG. 7 is an isometric cross-sectional view of the weight applicator system of FIG. 1 showing the applicator assembly axially translating toward the wheel-tire assembly and a radial portion of the applicator assembly moving radially outward to apply the weighted material to a flange of the wheel-tire assembly.

The radial portion 34 of the applicator assembly 30 is connected to the base portion 32 and is operable to radially move relative to the base portion 32 between a retracted position and an extended position. For instance, the radial portion 34 may be in opposed contact with the base portion 32 while in the retracted position (FIG. 1) and may be disposed radially outward from the base portion 32 while in the extended position (FIG. 7). In some examples, a radial actuator 134 radially moves the radial portion 34 relative to the base portion 32 (and also the shaft 20) in a radially outward direction away from the shaft 20 to the extended position and in an opposite radially inward direction toward the shaft 20 to the retracted position. As with the axial actuator 132, the actuator controller 52 may be in communication with the radial actuator 134 to control the radial position of the radial portion 34 relative to the shaft 20.

In some implementations, the pressure roller 36 is rotatably supported by the radial portion 34 and is operative to rotate about an axis of rotation 38 to receive the weighted material 12 from the weight feed device 40 and apply the weighted material 12 to the wheel-tire assembly 16 at one or more specified locations. In some examples, the axis of rotation 38 of the pressure roller 36 extends in a direction that converges with the longitudinal axis L of the shaft 20. For instance, the axis of rotation 38 and the longitudinal axis L may converge with one another in a direction toward the wheel-tire assembly 16 and may extend away from one another in an opposite direction away from the wheel-tire assembly 16. In some configurations, a drive motor 35 is operatively connected to the pressure roller 36 to cause the pressure roller 36 to rotate about the axis of rotation 38 when the drive motor 35 operates in an ON state. A drive motor controller 56 may be in communication with the drive motor 35 to control the drive motor 35 between an OFF state and the ON state to control rotation of the pressure roller 36. The processor 50 may have supervisory control over the drive motor controller 56.

Figure 8:
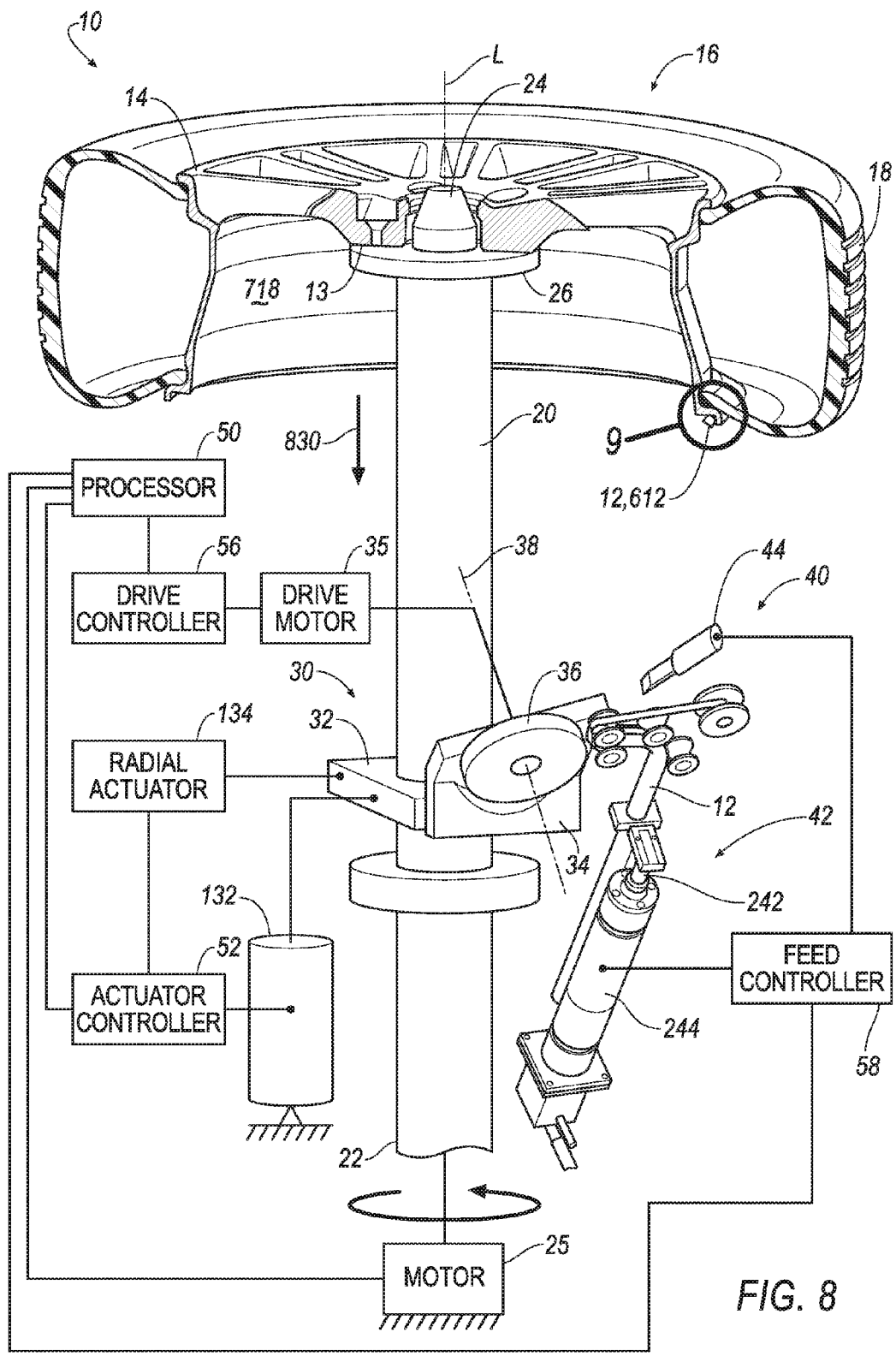
FIG. 8 is an isometric cross-sectional view of the weight applicator system of FIG. 1 showing the applicator assembly axially translating away from the wheel-tire assembly after a pressure roller of the applicator assembly applies the weighted material to a flange of the wheel-tire assembly.

The weight feed assembly 40 is operative to feed a prescribed length of the weighted material 12 to the pressure roller 36 (FIG. 3), whereby the axial actuator 132 axially translates the applicator assembly 30 along the length of the shaft 20 toward the wheel-tire assembly 16 (FIG. 7) and the radial actuator 134 radially translates the radial portion 34 (FIG. 7) to allow the pressure roller 36 to apply the prescribed length of the weight material 12 to the wheel-tire assembly 15 (FIG. 8). In some implementations, the weight feed assembly 40 includes a dispenser 42 operative to feed a strip of the weighted material 12 and a cutter 44 operative to cut the weighted material 12 into a segment having the prescribed length associated with a desired magnitude of weight. In some configurations, the dispenser 42 includes a linear actuator 242 actuated by a power stroke within a cylinder 244. The cylinder 244 may be pneumatic or powered by fuel. A feed controller 58 may be in communication with the dispenser 42 to control the cylinder 244 to translate the linear actuator 242 for advancing the strip of weighted material 12 toward the pressure roller 36. The feed controller 58 may also be in communication with the cutter 44 to control the cutter 244 to advance toward the pressure roller 36 to thereby cut the weighted material 12 into segments having prescribed lengths. Accordingly, the feed controller 58 may synchronize the operation of the dispenser 42 and the cutter 44 for controlling a rate at which the weighted material 12 is applied to the pressure roller 36 and cutting the weighted material 12 after the prescribed length has advanced onto the pressure roller 36. The processor 50 may have supervisory control over the feed controller 58.

In some examples, the weighted material 12 includes a continuous strip of high-density weight material having a substantially uniform cross-section. In these examples, the weighted material 12 may be flexible and stored in a roll and the cross-section may be rope-shaped. For instance, the dispenser 42 may feed the strip of the weighted material 12 from a spool located at or near the dispenser 42. Moreover, the continuous strip of weighted material 12 may include at least one side partially or fully covered with an adhesive 312 (FIGS. 3 and 4) to adhere a cut segment of the weighted material 12 to the wheel-tire assembly 16. The adhesive material 312 may be in the form of an acrylic foam tape and a lining or backing 13 (FIG. 2) may cover an exposed surface of the tape to prevent the tape from sticking to portions of the weighted material 12 when stored in a roll. Additionally, the backing 13 may prevent contaminants from reducing the effectiveness of the adhesive.

Figure 2:
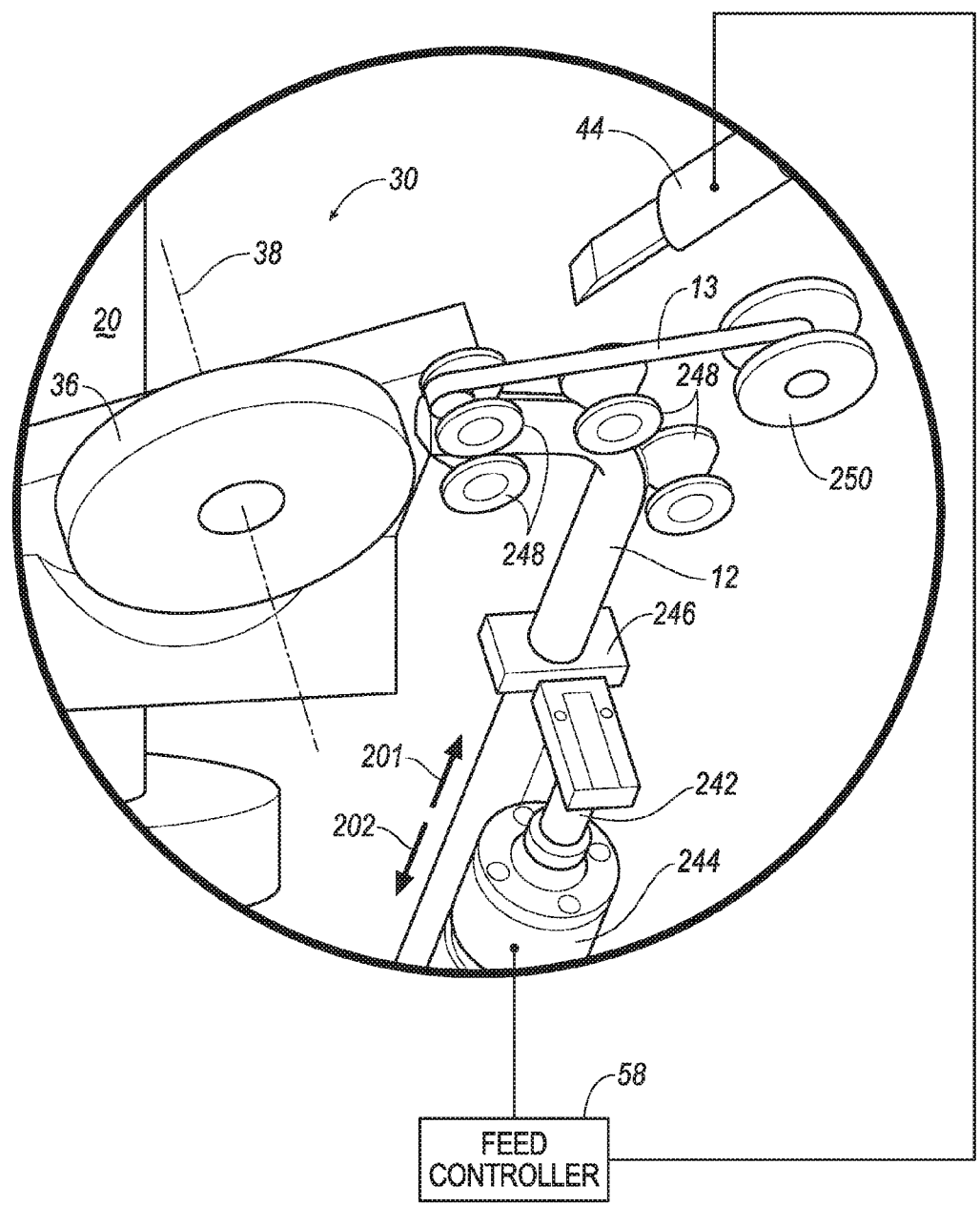
FIG. 2 is a detailed view of the weight feed assembly and a pressure roller of the applicator assembly of FIG. 1.

Referring to FIG. 2, a detailed view enclosed within area 2 of FIG. 1 shows the dispenser 42 and the cutter 44 of the weight feed apparatus 40. The dispenser 42 includes the linear actuator 242 configured to linearly translate in a first direction 201 away from the cylinder 244 and in an opposite second direction 202 toward the cylinder 244. In some implementations, a ratchet mechanism 246 (e.g., a pawl) associated with the linear actuator 242 is configured to engage with a portion of the length of the weighted material 12 when the linear actuator 242 translates in the first direction 201 and disengage from the weighted material 12 when the linear actuator 242 translates in the second direction 202. Accordingly, the ratchet mechanism 246 may advance/feed the weighted material 12 along the first direction 201 when the linear actuator 242 moves in the first direction 201 while preventing movement by the weighted material 12 along the second direction 202 when the linear actuator 242 moves in the second direction 202.

In some configurations, the weight feed apparatus 40 includes one or more idler rollers 248 operative to guide the strip of weighted material 12 fed by the dispenser 42 for application to the pressure roller 36. In some examples, the idler rollers 248 each define an axis of rotation substantially parallel to the axis of rotation 38 of the pressure roller 36. In other examples, at least one of the idler rollers 248 defines an axis of rotation that converges with the axis of rotation 38 of the pressure roller 36. In some configurations, a take-up roller 250 is operative to remove the backing 13 from the weighted material 12 to expose the adhesive 312 when the weighted material 12 is applied to the pressure roller 36.

Figure 3:
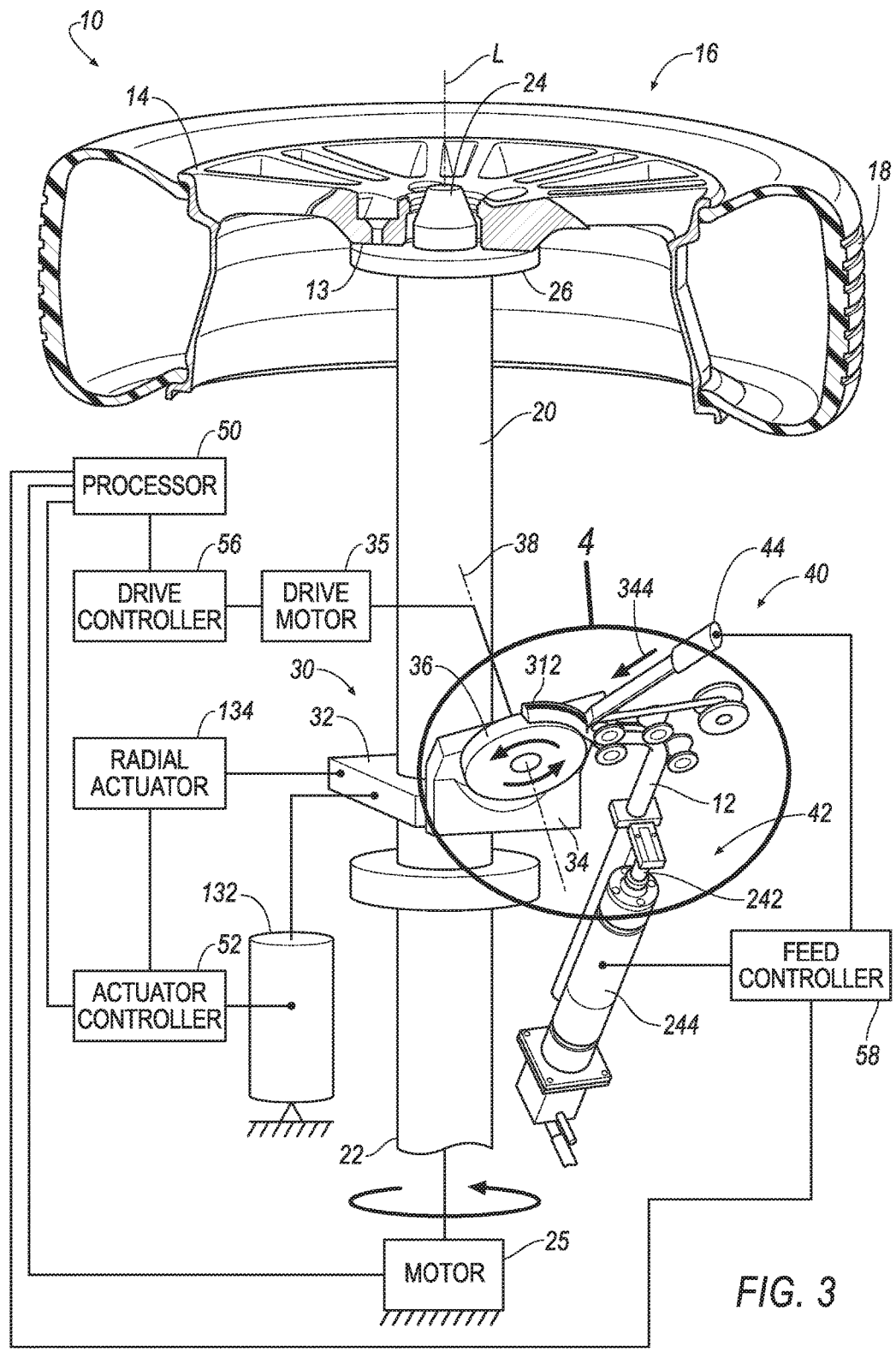
FIG. 3 is an isometric cross-sectional view of the weight applicator system of FIG. 1 showing a cutter of the weight feed assembly cutting a strip of the weighted material into a segment having a prescribed length.
Figure 4:
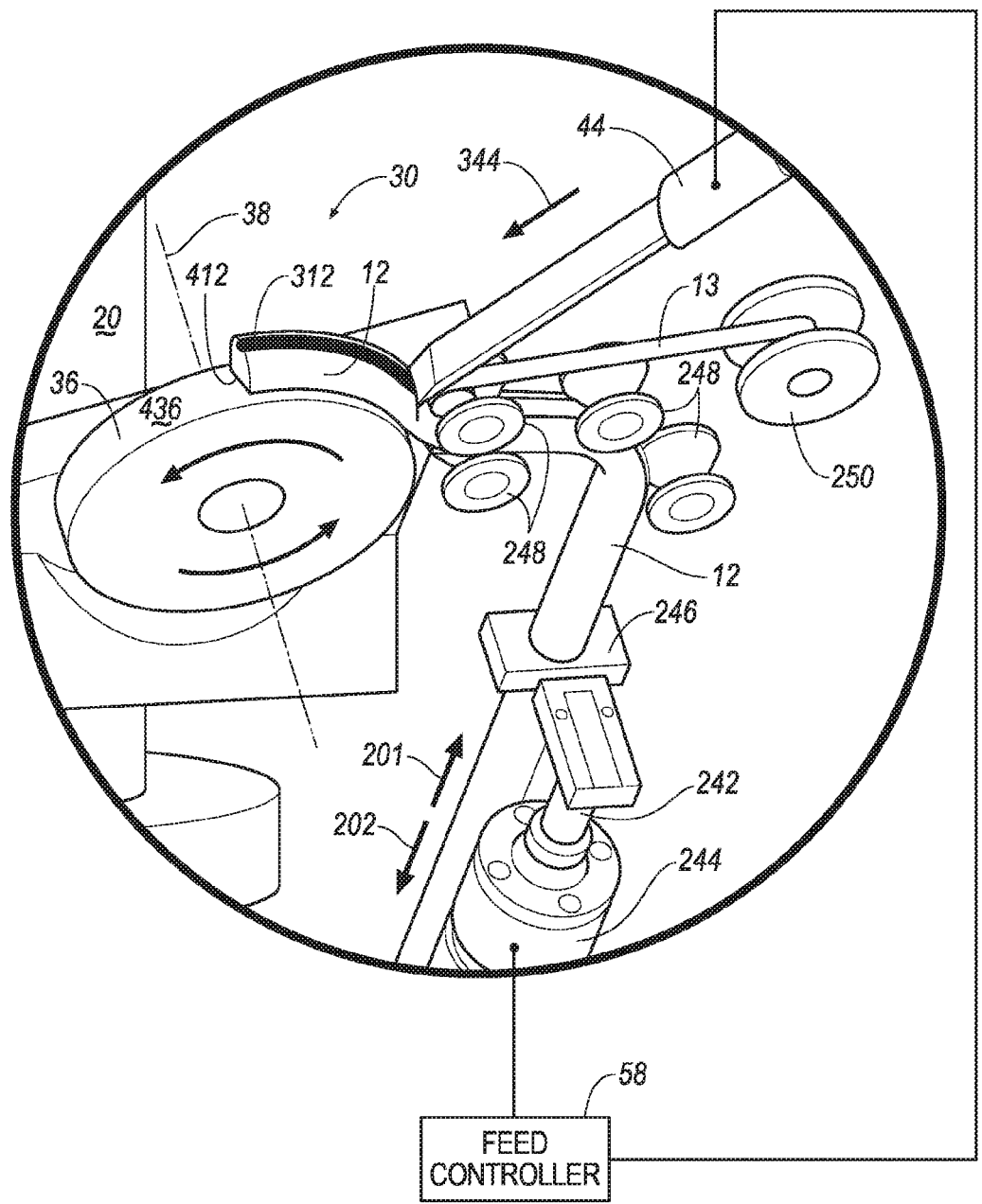
FIG. 4 is a detailed view of the weight applicator system of FIG. 3 showing the cutter moving in a cutting direction to cut the weighted material into the segment having the prescribed length.

Referring to FIG. 3, the drive motor controller 56 controls the drive motor 35 from the OFF state to the ON state to rotate the pressure roller 36 about the axis of rotation 38 to receive the weighted material 12 fed from the dispenser 42. In some examples, the drive motor controller 56 communicates with the feed controller 58 via the processor 50 such that the drive motor 35 causes the pressure roller 36 to rotate in a synchronized fashion with the rate at which the feed controller 58 controls the cylinder 244 to actuate the linear actuator 242. FIG. 3 shows the feed controller 58 controlling the cutter 44 to advance in a cutting direction 344 toward the pressure roller 36 to cut the weighted material 12 responsive to the prescribed length of the weighted material 12 advancing onto to the pressure roller 36. FIG. 4 provides a detailed view enclosed within area 4 of FIG. 3 showing the cutter 44 advancing in the cutting direction 344 to cut the strip of weighted material 12 such that the prescribed length of the weighted material is applied to the pressure roller 36 and severed from the continuous strip of weighted material 12. In some examples, the drive motor 35 continues to rotate the pressure roller 36 as the cutter 44 cuts the weighted material 12 while the linear actuator 242 transitions to an OFF state to cease the advancement of the continuous strip of weighted material 12 toward the pressure roller 36.

The take-up roller 250 is operative to remove the backing 13 from the weighted material 12 by tension just prior to application onto the pressure roller 36. The weighted material 12 includes a rope-shaped cross-section and has a non-adhesive side 412 that opposes and mates with an outer circumferential surface 436 of the pressure roller 36 while the adhesive 312 is applied on an opposite side of the weighted material 12 than the non-adhesive side 412. The non-adhesive side 412 of the rope-shaped weighted material 12 may be substantially flat to facilitate engagement with the outer circumferential surface 436 of the pressure roller 36, while the opposite side of the weighted material 12 including the adhesive 312 may be arcuate (e.g., curved) to conform with surfaces of the wheel 14 that the weighted material 12 is to be applied.

Figure 5:
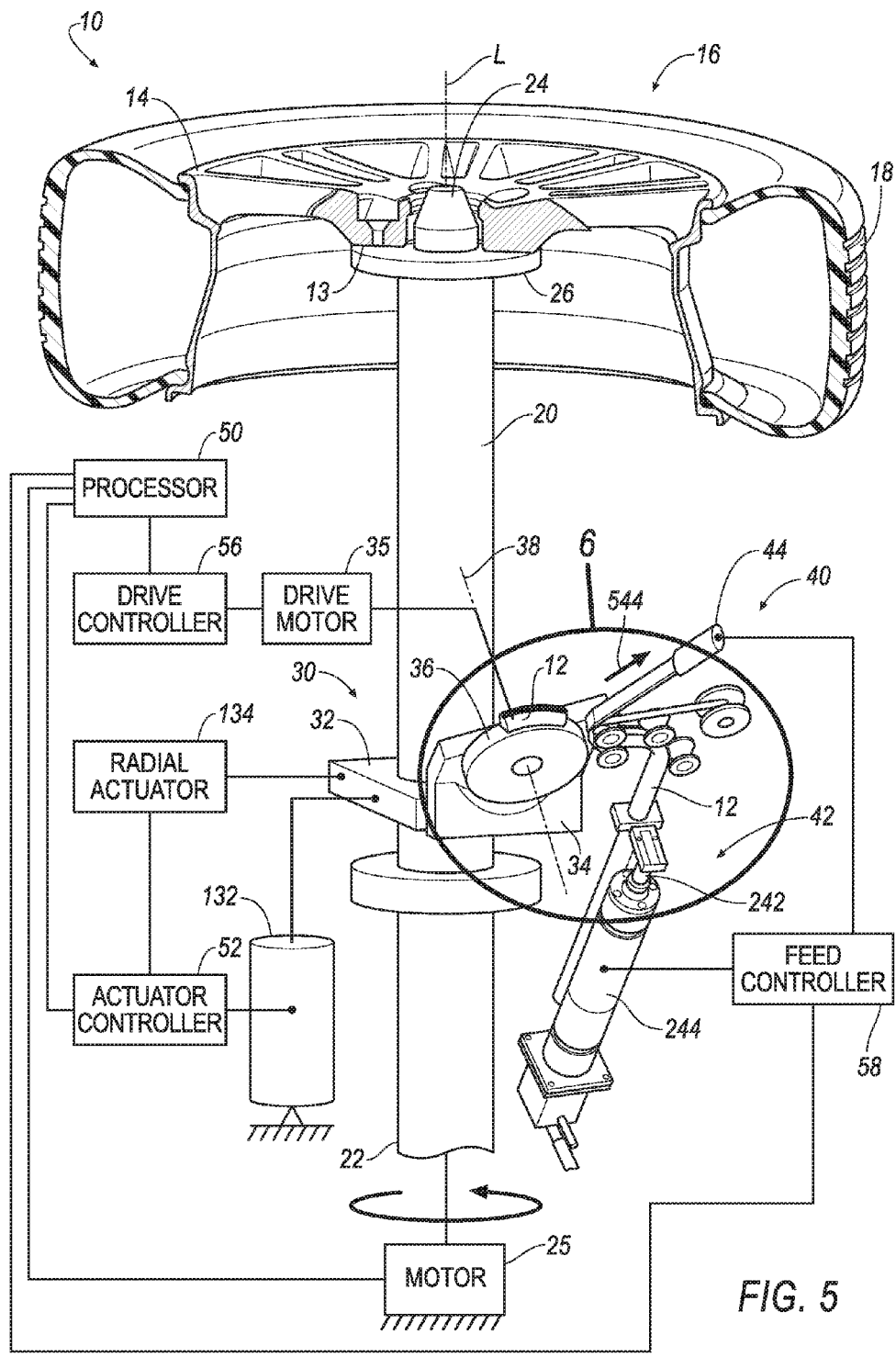
FIG. 5 is an isometric cross-sectional view of the weight applicator system of FIG. 1 showing a prescribed length of the weighted material applied to an outer circumferential surface of a pressure roller of the applicator assembly.
Figure 6:
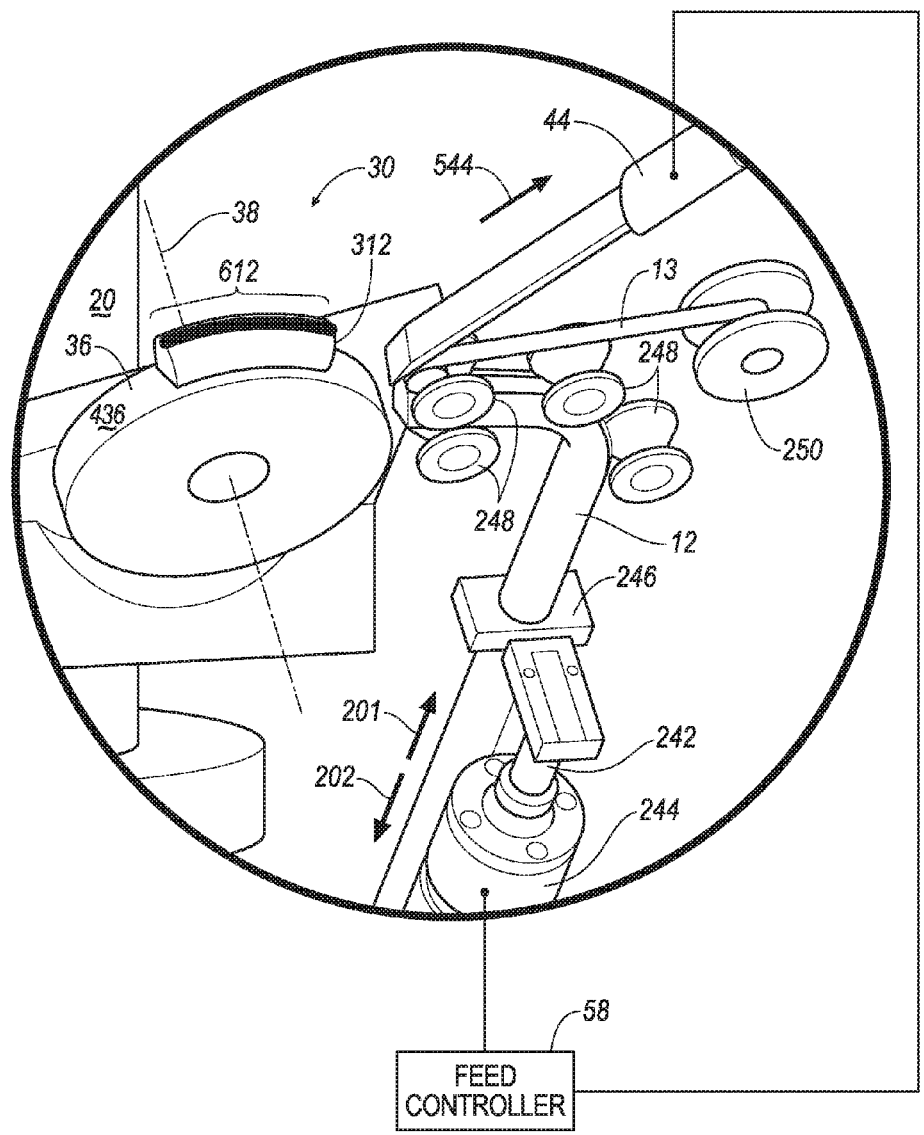
FIG. 6 is a detailed view of the weight applicator system of FIG. 5 showing a cutter of the weight feed assembly moving in a retracted direction after cutting the prescribed length of the weighted material.

Referring to FIG. 5, the drive motor controller 56 controls the drive motor 35 to transition from the ON state to the OFF state to cease rotation by the pressure roller 36 after the weighted material 12 has been applied to the pressure roller 36 and has been cut from the continuous strip by the cutter 44. Concurrently, the feed controller 58 controls the cutter 44 to move in a retracted direction 544 away from the pressure roller 36. FIG. 6 provides a detailed view enclosed within area 6 of FIG. 5 showing a segment 612 associated with the prescribed length of the weighted material 12 cut from the continuous strip and mated with the outer circumferential surface 436 of the pressure roller 36. In some configurations, at least the outer circumferential surface 436 of the pressure roller 36 is magnetized and the weighted material 12 includes one or more ferromagnetic materials such that a magnetic force attracts the weighted material 12 fed from the dispenser 42 onto the outer circumferential surface 436 of the pressure roller 36 and retains the weighted material 12 thereon until attaching with the wheel-tire assembly 16 by the adhesive 312. Additionally or alternatively, a channel or groove may be formed in the outer circumferential surface 436 of the pressure roller 36 to retain the weighted material 12 thereon. For instance, the channel or groove may be slightly narrower than a width of the weighted material 12 such that the channel or groove is operative to pinch and retain the weighted material 12 upon the outer circumferential surface 436.

FIG. 7 shows the pressure roller 36 of the weight applicator system 10 applying the prescribed length 612 of weighted material 12 to a flange 714 of the wheel 14. A portion of the wheel-tire assembly 16 is removed to expose the joining of the tire 18 upon the wheel 14. A tread of the tire 18 separates opposing sidewalls retained by the wheel 14 between a front face 716 associated with a hub portion of the wheel 16 and a rear face 715 disposed on an opposite side of the wheel 14 than the front face 716. The flange 714 extends axially away from an outer periphery of the rear face 715 relative to the view of FIG. 7. Accordingly, the rear face 715 and the flange 714 extending therefrom will be located within a wheel well of a vehicle body when the wheel-tire assembly 16 is mounted to an axle of the vehicle.

A radial wall 718 of the wheel 14 separates the front face 716 and the rear face 714 and circumscribes a central cavity 720. In some implementations, the actuator controller 52 controls the axial actuator 132 to axially move the applicator assembly 30 in an upward direction 730 toward the distal end 24 of the shaft 20 until the prescribed length 612 of the weighted material 12 upon the pressure roller 36 is axially aligned with the flange 714 of the wheel 14. The actuator controller 52 may also control the radial actuator 134 to radially move the radial portion 34 of the applicator assembly 30 relative to the base portion 32 in a radially outward direction 732 to press the prescribed length 612 of weighted material 12 against the flange 714. Here, the radial actuator 134 may control the radial portion 34 to provide sufficient pressure to compress the weighted material 12 between the pressure roller 36 and the flange 714 such that the weighted material 12 adheres to the flange 714 by the adhesive 312. As the axis of rotation 38 of the pressure roller 36 is angled relative to the axis L of the wheel 14, the prescribed length 612 of the weighted material 12 can be situated within an area where the rear face 715 and the flange 714 interconnect. In some examples, the radial portion 34 is configured as a plunger portion that radially extends from the base portion 32.

In some implementations, when the weighted material 12 is pressed by the pressure roller 36 against the flange 714 of the wheel 14, the tire-wheel assembly 16 and the pressure roller 36 are each controlled to rotate in opposite directions to allow the pressure roller 36 to apply the prescribed length 612 of the weighted material 12 to the flange 714. For instance, the shaft motor 25 may control the shaft 20 and the wheel-tire assembly 16 to commonly rotate in a counter clockwise (CCW) direction about the longitudinal axis L of the shaft 20 and the drive motor 35 may control the pressure roller 36 to rotate in a clockwise direction (CW) about the axis of rotation 38 of the pressure roller 36. In other examples, the wheel-tire assembly 16 may rotate in the CW direction and the pressure roller 36 may rotate in the CCW direction.

Figure 9:
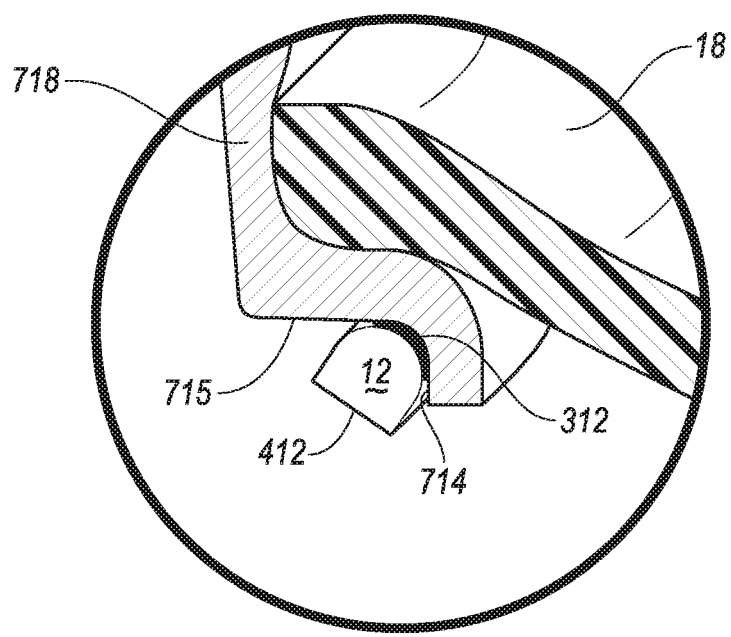
FIG. 9 is a detailed view of FIG. 8 showing an adhesive material attaching the weighted material to the flange of the wheel.

Referring to FIG. 8, the radial actuator 134 controls the radial portion 34 of the applicator assembly to move radially inward to the retracted position once the prescribed length 612 of weighted material 12 is applied to the flange 714 of the wheel 14. Meanwhile, the axial actuator 132 axially moves the applicator assembly 30 in a downward direction 830 toward the proximal end 22 of the shaft 20 until the pressure roller 36 is aligned to receive the weighted material 12 from the dispenser 42. FIG. 9 provides a detailed view within area 9 of FIG. 8 showing the prescribed length 612 of the weighted material 12 attached to the wheel 14 at a location between the flange 714 and the rear face 715. For instance, the adhesive material 312 mates with a curved surface interconnecting the rear face 715 and the flange 714 to attach the weighted material 12 to the flange 714 of the wheel 14. The rope-like cross-sectional shape of the weighted material 12 includes an arcuate surface where the adhesive material 312 is applied that is configured to conform with the corresponding curved/arcuate surface of the wheel 14 that interconnects the rear face 715 and the flange 714. By contrast, weighted material 12 associated with flat or ribbon-shaped cross-sections are not suitable for application to the wheel 14 at locations having curved surfaces such as the flange 714, but instead, are more suitable for application to substantially flat surfaces such as the inner diameter of the radial wall 718. In some examples, the angle of the axis of rotation 38 for the pressure roller 36 relative to the longitudinal axis of the shaft 20 is adjustable based upon the cross-sectional shape of the weighted material 12 to be applied and the location or feature of the wheel 14 selected to receive the weighted material 12. For instance, the angle of the axis of rotation 38 for the pressure roller 36 can be adjusted to be substantially parallel with the longitudinal axis L of the shaft 20 such that flat or ribbon-shaped weighted materials can be applied to the inner diameter of the radial wall 718.

Figure 10:
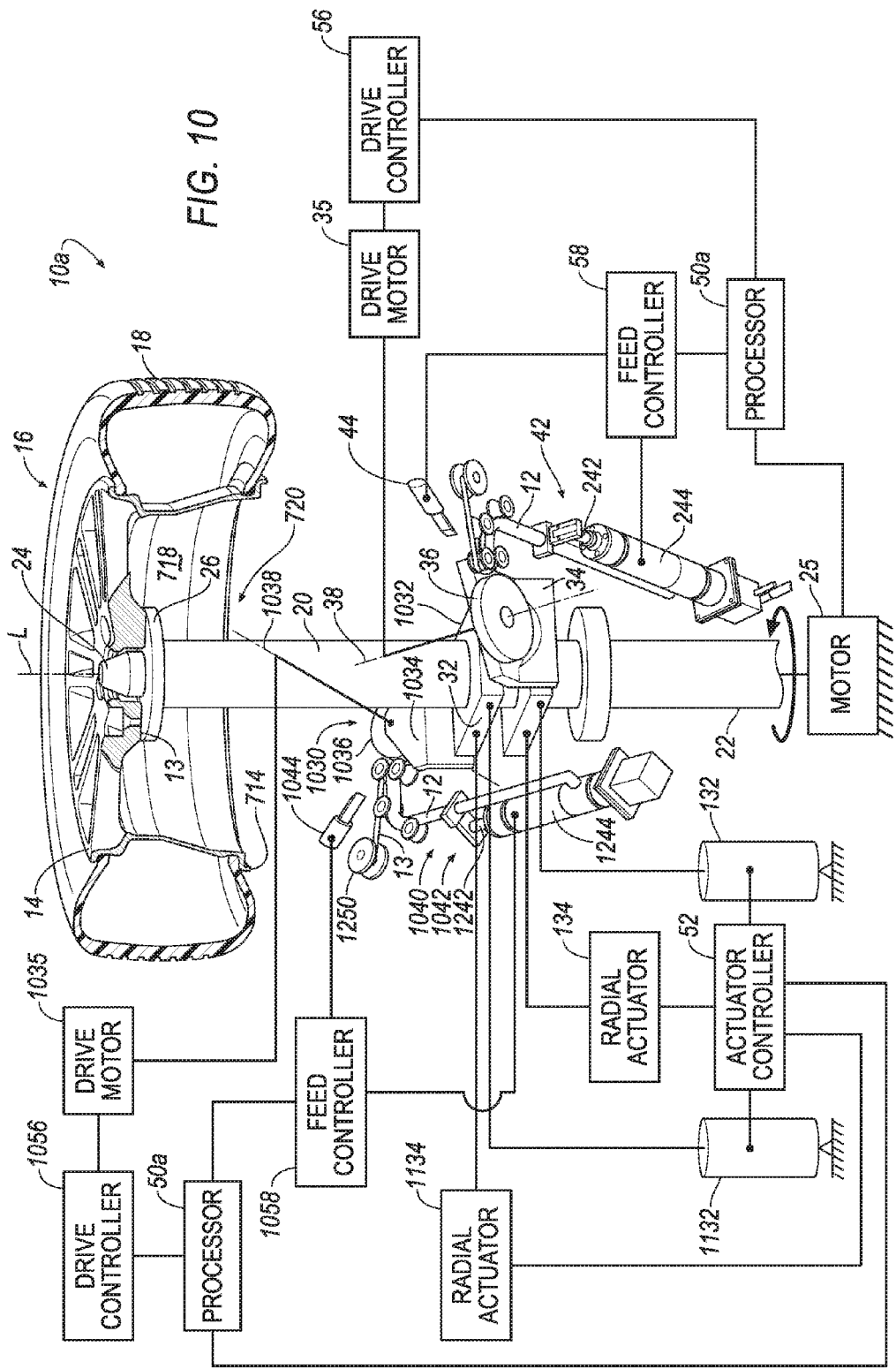
FIG. 10 is an isometric cross-sectional view of an example weight applicator system having two weight feed assemblies operatively connected to respective applicator assemblies for applying a weighted material to specified locations of a wheel-tire assembly.

Referring to FIG. 10, an applicator system 10a is provided and includes the shaft 20, first and second applicator assemblies 30, 1030 supported by the shaft 20, first and second weight feed assemblies 40, 1040 operative to provide the weighted material 12 to respective ones of the applicator assemblies 30, 1030, and a processor 50a in communication with the applicator assemblies 30, 1030 and the weight feed assemblies 40, 1040. In view of the substantial similarity in structure and function of the components associated with the applicator system 10 with respect to the applicator system 10a, like reference numerals are used hereinafter and in the drawings to identify like components while like reference numerals containing letter extensions are used to identify those components that have been modified.

The shaft 20 has the length extending along the longitudinal axis L between the proximal end 22 operatively connected to the shaft motor 25 and the distal end 24 associated with the wheel support member 26 releasably coupled to the wheel-tire assembly 16 for common rotation with the shaft 20 about the longitudinal axis L. The shaft motor 25 may operate in the ON state to control rotation of the shaft 20 about the longitudinal axis L.

The first applicator assembly 30 includes the base portion 32, the radial portion 34, and the pressure roller 36 rotatably supported by the radial portion 34. As with the applicator system 10 of FIGS. 1-9, the drive motor 35 is operatively connected to the pressure roller 36 to cause the pressure roller 36 to rotate about the axis of rotation 38 when the drive motor controller 56 and/or the processor 50a controls the drive motor 35 to operate in the ON state. The axial actuator 132 may control the applicator assembly 30 to axially move along the length of the shaft 20, while the radial actuator 134 may radially move the radial portion 34 relative to the base portion 32. In some examples, the actuator controller 52 and/or the processor 50a communicates with the axial actuator 132 and the radial actuator 134 to control respective ones of the axial position of the base portion 32 relative to the shaft 20 and the radial position of the radial portion 34 relative to the shaft 20.

The first weight feed assembly 40 includes the dispenser 42 operative to feed the strip of weighted material 12 and the cutter 44 operative to cut the weighted material 12 into the segment having the prescribed length associated with the desired magnitude of weight for balancing the wheel-tire assembly 16. In some examples, the dispenser 42 includes the linear actuator 242 actuated by the power stroke within the cylinder 244 to advance the weighted material 12 stored in the roll around a spool. As with the applicator system 10 of FIGS. 1-9, the feed controller 58 and/or the processor 50a may synchronize the operation of the dispenser 42 and the cutter 44 to control a rate at which the weighted material 12 is applied to the pressure roller 36 and cutting the weighted material 12 after the prescribed length has advanced onto the pressure roller 36.

In some implementations, the second applicator assembly 1030 includes a base portion 1032, a radial portion 1034, and a pressure roller 1036 rotatably supported by the radial portion 1034. The base portion 1032 is disposed upon the shaft 20 between the proximal end 22 and the distal end 24 and axially above the base portion 32 of the first applicator assembly 30 and may translate axially along the length of the shaft 20. Accordingly, the first and second applicator assemblies 30, 1030 are axially offset from one another between the proximal end 22 and the distal end 24 of the shaft 20. In some examples, an axial actuator 1132 axially moves the base portion 1032 along the length of the shaft 20 in the first direction toward the wheel-tire assembly 16 at the distal end 24 of the shaft 20 and in the opposite second direction away from the wheel-tire assembly 16. Here, the actuator controller 52 may be in communication with the axial actuator 1132 to control the axial position of the base portion 1032 relative to the shaft 20. The processor 50 may have supervisory control over the actuator controller 1052.

The radial portion 1034 of the second applicator assembly 1030 is connected to the base portion 1032 and is operable to radially move relative to the base portion 1032 between a retracted position and an extended position in a similar fashion to the radial portion 34 of the first applicator assembly 30. In some examples, a radial actuator 1134 radially moves the radial portion 1034 relative to the base portion 1032 (and also the shaft 20) in a radially outward direction away from the shaft 20 to the extended position and in an opposite radially inward direction toward the shaft 20 to the retracted position. As with the axial actuator 1132, the actuator controller 52 may be in communication with the radial actuator 1134 to control the radial position of the radial portion 1034 relative to the shaft 20.

In some implementations, the pressure roller 1036 is operative to rotate about an axis of rotation 1038 to receive weighted material 12 from the second weight feed device 1040 and apply the weighted material 12 to the wheel-tire assembly 16 at one or more specified locations. In some examples, the axis of rotation 1038 of the pressure roller 1036 extends in a direction that converges with the longitudinal axis L of the shaft 20 and also the axis of rotation 38 of the pressure roller 36 of the first applicator assembly 30. For instance, the axis of rotation 38 of the pressure roller 36, the axis of rotation 1038 of the pressure roller 1036, and the longitudinal axis L may converge with one another in a direction toward the wheel-tire assembly 16 and may extend away from one another in an opposite direction away from the wheel-tire assembly 16. Optionally, at least one of the pressure rollers 36, 1036 includes an axis of rotation 38, 1038 that extends substantially perpendicular to the longitudinal axis L of the shaft 20 such that the weighted material 12 can be applied along the inner diameter of the radial wall 718 of the wheel 14.

In some configurations, a drive motor 1035 is operatively connected to the pressure roller 1036 to cause the pressure roller 1036 to rotate about the axis of rotation 1038 when the drive motor 1035 operates in an ON state. A drive motor controller 1056 may be in communication with the drive motor 1035 to control the drive motor 1035 between an OFF state and the ON state to control rotation of the pressure roller 1036. The processor 50a may have supervisory control over the drive motor controller 1056.

In some implementations, the second weight feed assembly 1040 is substantially identical to the first weight feed assembly 40 described above with reference to FIGS. 1-9 and includes a dispenser 1042 operative to feed a strip of weighted material 12 from a spooled roll and a cutter 1044 operative to cut the weighted material 12 into a segment having a prescribed length associated with the desired magnitude of weight for balancing the wheel-tire assembly 16. The cutter 1044 associated with the second weight feed assembly 1040 may cut the weighted material 12 into segments having prescribed lengths that are different or the same as the segments of the weighted material 12 cut by the cutter 44 of the first weight feed assembly 40. In some examples, the dispenser 1042 includes a linear actuator 1242 actuated by a power stroke within a cylinder 1244 to advance the weighted material 12 from the spooled roll. As with the applicator system 10 of FIGS. 1-9, a feed controller 1058 and/or the processor 50a may synchronize the operation of the dispenser 1042 and the cutter 1044 to control a rate at which the weighted material 12 is applied to the pressure roller 1036 and cutting the weighted material 12 after the prescribed length has advanced onto the pressure roller 1036. The second weight feed assembly 1040 may also include a take-up roller 1250 for removing backing 13 from the weighted material 12 used for covering the adhesive material 312.

The applicator system 10a allows the weighted material 12 fed from each of the weight feed assemblies 40, 1040 to be concurrently applied to different locations of the wheel-tire assembly 16 by respective ones of the applicator assemblies 30, 1030. For example, the axial actuator 1132 may axially translate the second applicator assembly 1030 along the length of the shaft 20 toward the wheel-tire assembly 16 and the radial actuator 1134 may radially translate the radial portion 1034 to allow the pressure roller 1036 to apply the prescribed length of weighted material 12 to the tire-wheel assembly 16 (e.g., the flange 714). The drive motor 1035 and the shaft motor 25 may cooperate to rotate respective ones of the pressure roller 1036 and the tire-wheel assembly 16 in opposite directions to attach the prescribed length of weighted material 12 to the flange 714 via the adhesive 312. Upon application of the weighted material 12 from the pressure roller 1036, the radial actuator 1134 may retract the radial portion 1034 and the axial actuator 1132 may axially translate the second applicator assembly 1030 into the cavity 720 of the tire-wheel assembly 16 to provide space for the axial actuator 132 to axially translate the first applicator assembly 30 toward the wheel-tire assembly 16 until the pressure roller 36 is aligned with the flange 714 of the wheel 14. Thereafter, the radial actuator 34 may radially translate the radial portion 34 to allow the pressure roller 36 to apply the prescribed length of weighted material 12 to the flange 714 as described above with respect to the applicator system 10 in the example of FIG. 7. Accordingly, two separate segments of the weighted material 12 having respective prescribed lengths can be successively applied to different locations of the wheel-tire assembly 14.

In other implementations, the pressure roller 1036 defines an axis of rotation substantially perpendicular to the longitudinal axis L of the shaft 20 and is configured to apply a prescribed length of weighted material 12 having a ribbon-shaped cross-section to the inner diameter of the radial wall 718 of the wheel 14. In these implementations, the axial displacement between the first and second applicator assemblies 30, 1030 allows the pressure roller 1036 to apply the prescribed length of ribbon-shaped weighted material 12 to the inner diameter of the radial wall 718 while the pressure roller 36 concurrently applies the prescribed length of rope-shaped weighted material 12 to the flange 714 of the wheel 14.

In some configurations, the applicator system 10a uses a single applicator assembly 30 that employs the first and second radial portions 34, 1034 each supporting respective ones of the pressure rollers 36, 1036. Here, the pressure rollers 36, 1036 each include the same axial position along the length of the shaft 20, and therefore, may each apply the same or different prescribed lengths of weighted material 12 to different locations of the flange 714 of the wheel 14 to expedite the weight application and balancing process.

Figure 11:
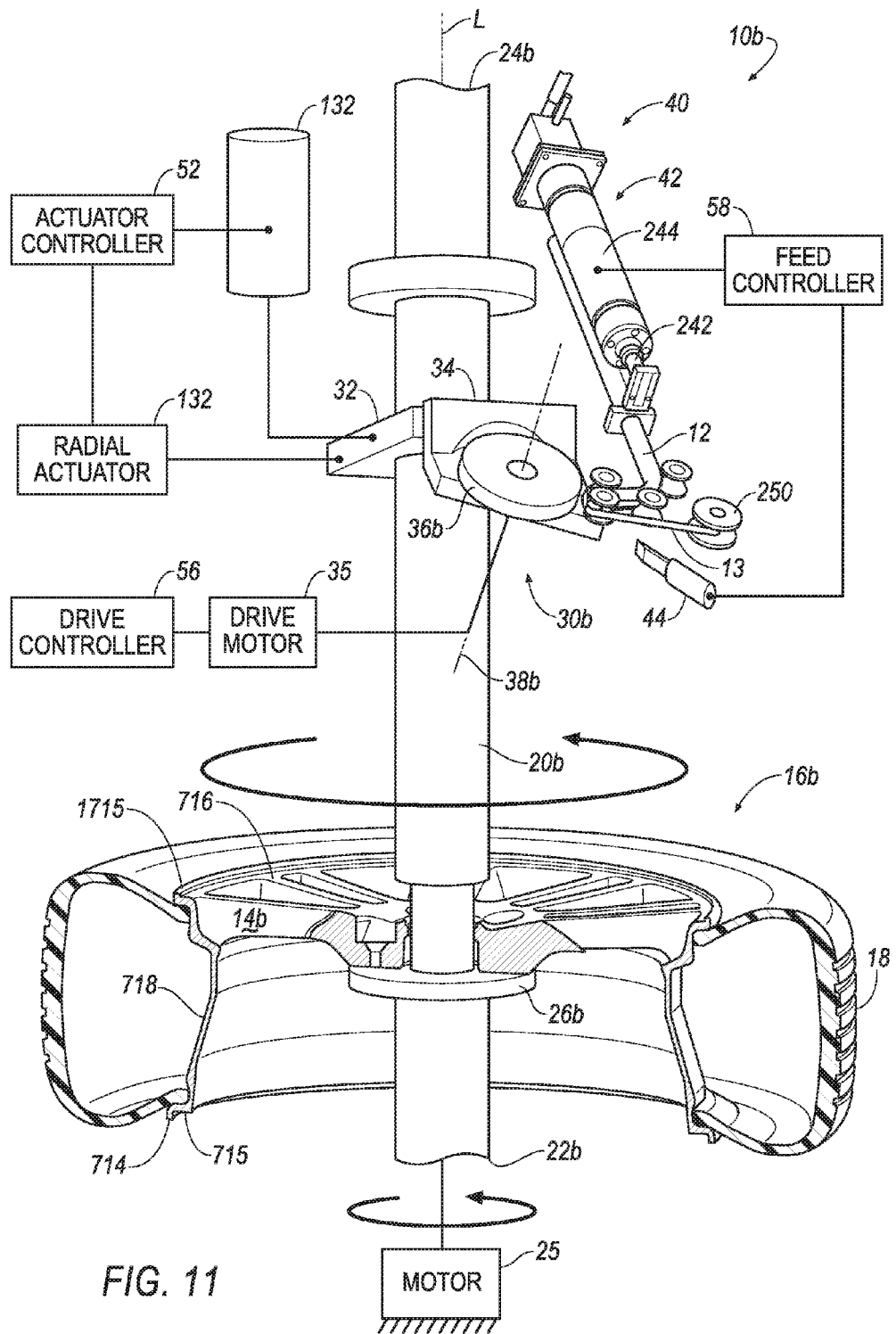
FIG. 11 is an isometric cross-sectional view of an example weight applicator system having a weight feed assembly and an applicator assembly for applying a weighted material to a wheel-tire assembly.

Referring to FIG. 11, an applicator system 10b is provided and includes the shaft 20b, an applicator assembly 30b supported by the shaft 20b, and the weight feed assembly 40 operative to provide the weighted material 12 to the applicator assembly 30b for application to a flange 1715 axially extending from the front face 716 of a wheel 14b of a tire-wheel assembly 16. In view of the substantial similarity in structure and function of the components associated with the applicator system 10 with respect to the applicator system 10b, like reference numerals are used hereinafter and in the drawings to identify like components while like reference numerals containing letter extensions are used to identify those components that have been modified.

The shaft 20b defines a length extending along a longitudinal axis L between a proximal end 22b operatively connected to the shaft motor 25 and a distal end 24b. A wheel support member 26b may extend radially around a circumference of the shaft 20b at a location axially displaced from the proximal end 22b of the shaft 20b. For example, the shaft 20b may extend through a central opening of the wheel-tire assembly 16b and the wheel support member 26b may oppose and engage with a hub surface 13 of the wheel 14b to support the wheel-tire assembly 16b for common rotation with the shaft 20b such that the wheel-tire assembly 16b is coaxial with the longitudinal axis L. For instance, fasteners (e.g., lug nuts) may be used to releasably fasten the wheel 14b to the wheel support member 26b.

Whereas the weight applicator system 10 of FIGS. 1-9 is configured to apply the prescribed length 612 of weighted material 12 upon the flange 714 extending from the rear face 715 of the wheel 14, the weight applicator system 10b is configured to apply the weighted material 12 upon the flange 1715 extending axially away from an outer periphery of the front face 716 relative to the view of FIG. 11. Accordingly, the front face 716 and the flange 1715 extending therefrom will be visible from the outside of the vehicle when the wheel-tire assembly 16*b* is mounted to an axle of the vehicle. Thus, the applicator assembly 30*b* is supported by the shaft 20*b* on a side of the wheel-tire assembly 16*b* that opposes the front face 716 of the wheel 14*b* so that the weighted material 12 may be applied to the flange 1715 extending from the front face 716 of the wheel 14*b*. By contrast, the applicator assembly 30 of FIGS. 1-9 is supported by the shaft 20 on the opposite side of the wheel-tire assembly 16 that opposes the rear face 715 of the wheel 14 for applying the weighted material 12 to the flange 714 extending from the rear face 715 of the wheel 14.

In some implementations, the applicator assembly 30*b* includes the base portion 32, the radial portion 34, and a pressure roller 36*b* rotatably supported by the radial portion 34. The axial actuator 132 via the actuator controller 52 axially moves the base portion 32 toward the wheel-tire assembly 16*b* at the proximal end 22*b* of the shaft 20*b* and also in an opposite direction away from the wheel-tire assembly 16*b* toward the distal end 24*b* of the shaft 20*b*. Likewise, the radial actuator 134 via the actuator controller 52 is operable to radially move the radial portion 34 of the applicator assembly 30*b* between the retracted position opposing the base portion 32 and the extended position disposed radially outward from the base portion 32. The pressure roller 36*b* is operative to rotate about an axis of rotation 38*b* to receive the weighted material 12 from the weight feed device 40 and apply the weighted material 12 to the flange 1715 extending from the front face 716 of the wheel 14. By contrast to the axis of rotation 38 of the pressure roller 36 of FIGS. 1-9 converging with the longitudinal axis L in the direction toward the distal end 24 of the shaft 20, the axis of rotation 38*b* of the pressure roller 36*b* of FIG. 11 converges with the longitudinal axis L in the direction toward the proximal end 22*b* of the shaft 20*b*. In some examples, the drive motor 35 is operatively connected to the pressure roller 36*b* to cause the pressure roller 36*b* to rotate about the axis of rotation 38*b* when the drive motor 35 operates in the ON state. The drive motor controller 56 may control the drive motor 35 between the OFF state and the ON state for controlling rotation of the pressure roller 36*b*.

The weight feed assembly 40 may include the dispenser 42 operative to feed the strip of the weighted material 12 and the cutter 44 operative to cut the weighted material 12 into the segment having the prescribed length associated with a desired magnitude of weight. The dispenser 42 may include the linear actuator 242 and the cylinder 244, and the feed controller 58 may control the cylinder 244 to translate the linear actuator 242 for advancing the strip of weighted material 12. The feed controller 58 may also be in communication with the cutter 44 to control the cutter 44 to advance toward the pressure roller 36*b* to thereby cut the weighted material 12 into segments having prescribed lengths. Accordingly, the feed controller 58 may synchronize the operation of the dispenser 42 and the cutter 44 for controlling a rate at which the weighted material 12 is applied to the pressure roller 36*b* and cutting the weighted material 12 after the prescribed length has advanced onto the pressure roller 36*b*. Once the weighted material 12 is applied to the pressure roller 36*b*, the actuator controller 52 may axially move the applicator assembly 30*b* downward toward the wheel 14*b* until the pressure roller 36*b* is axially aligned with the flange 1715. Thereafter, the actuator controller 52 may control the radial portion 34 to move radially outward (e.g. into the extended position) until the weighted material 12 is pressed against the flange 1715 and adheres thereto by the adhesive 312. The weight feed assembly 40 may include the take-up roller 250 to remove the backing 13 that covers the adhesive material 312 before applying the weighted material 12 to the pressure roller 36*b*. The pressure roller 36*b* and the wheel 14*b* may rotate in opposite directions so that pressure roller 36*b* can apply the weighted material 12 to the flange 1715 of the wheel 14*b*.

Figure 12:
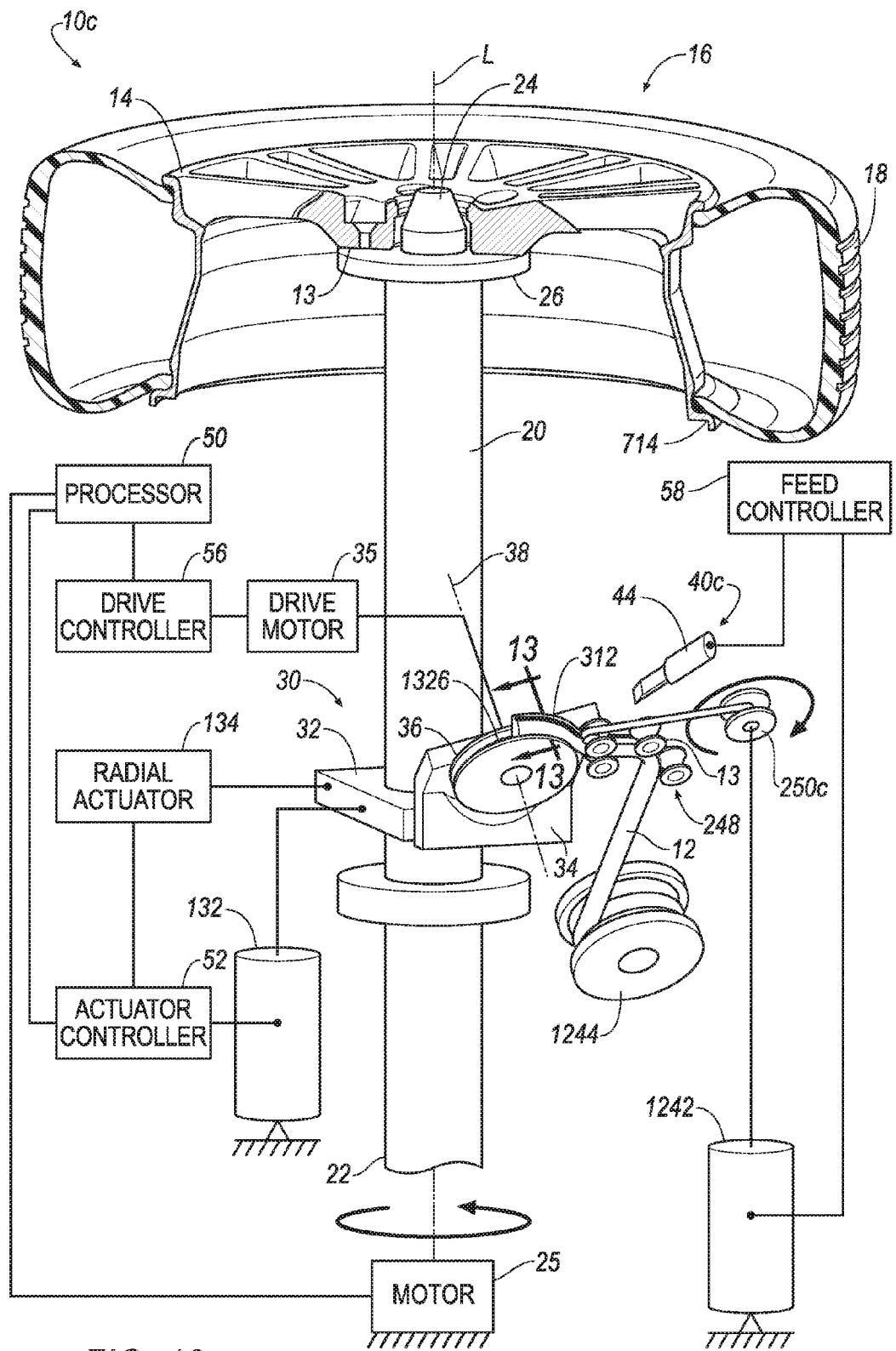
FIG. 12 is an isometric cross-sectional view of an example weight applicator system having a rotatable actuator to advance a strip of weighted material from a spool to a pressure roller.

Referring to FIG. 12, an applicator system 10*c* is provided and includes the shaft 20, the applicator assembly 30 supported by the shaft 20, and a weight feed assembly 40*c* operative to provide the weighted material 12 to the applicator assembly 30 for application to the flange 714 of the wheel 14. In view of the substantial similarity in structure and function of the components associated with the applicator system 10 with respect to the applicator system 10*c*, like reference numerals are used hereinafter and in the drawings to identify like components while like reference numerals containing letter extensions are used to identify those components that have been modified.

The applicator assembly 30 is supported by the shaft 20 between the proximal end 22 connected to the shaft motor 25 and the distal end 24 extending through at least a portion central opening of the wheel-tire assembly 16, whereby the wheel support member 26 may oppose and engage with a hub surface 13 of the wheel 14 to support the wheel-tire assembly 16 upon the shaft 20 such that the wheel-tire assembly 16 is coaxial with the longitudinal axis L of the shaft 20. The axial actuator 132 axially moves the applicator assembly 30*c* along the length of the shaft 20 in the first direction toward the distal end 24 of the shaft 20 and the opposite second direction toward the proximal end 22 of the shaft 20. The radial actuator 134 radially moves the radial portion 34 of the applicator assembly 30 relative to the base portion 32 between the retracted position and the extended position, thereby allowing the pressure roller 36 to apply the prescribed length of the weight material 12 to the wheel-tire assembly 16.

Unlike the weight feed assembly 40 of FIGS. 1-9 that employs the dispenser 42 including the linear actuator 242 to dispense the weighted material 12, the weight feed assembly 40*c* in the example of FIG. 12 employs a rotational actuator 1242 operative to rotate a take-up roller 250*c* for unwinding the weighted material 12 from a spool 1244 operatively coupled to the take-up roller 250*c*. The feed controller 58 may be in communication with the rotational actuator 1242 to transition the rotational actuator 1242 from an OFF state to an ON state for rotating the take-up roller 250*c* and thereby drive the spool 1244 for common rotation therewith. During set-up or priming of a new roll of weighted material 12 for use by the applicator system 10*c*, a strip of the weighted material 12 may be manually unwound from the spool 1244 and fed through the idler pulleys 248 and the backing 13 may be pulled from the strip of weighted material 12 and attached to the take-up roller 250*c*. Here, rotation of the take-up roller 250*c* by the rotational actuator 1242 continues to pull the backing 13 from the weighted material 12 by tension while the idler pulleys 248 and the spool 1244 cooperate to advance the weighted material 12 for application to the pressure roller 36 with the backing 13 removed and the adhesive 312 exposed. The feed controller 58 may operate the cutter 44 to cut the weighted material 12 into a segment having a prescribed length associated with a desired magnitude of weight for balancing the wheel-tire assembly 16.

Figure 13:
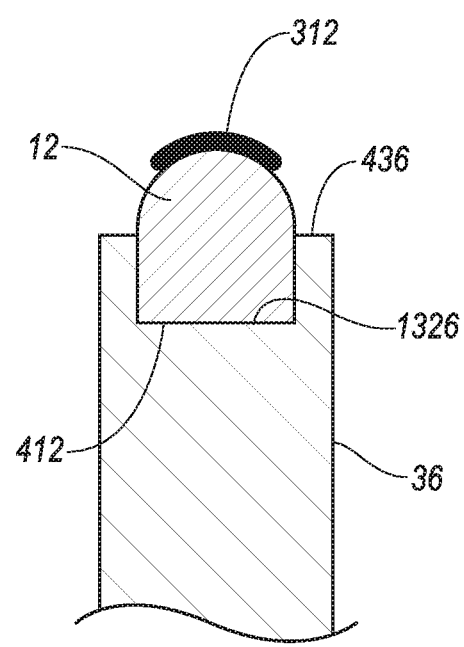
FIG. 13 is a cross-sectional view taken along line 13-13 of FIG. 12 showing the pressure roller defining a trough configured to retain a predetermined length of the weighted material.

FIG. 13 provides a cross-sectional view taken along line 13-13 of FIG. 12 showing the pressure roller 36 defining a trough 1326 formed through the outer circumferential surface 436 and configured to retain the strip of weighted material 12 fed from the weight feed assembly 40c. Specifically, the trough 1326 is associated with a channel for receiving the non-adhesive side 412 of the weighted material 12 while the opposite side of the weighted material 12 associated with the adhesive 312 is exposed from the trough 1326. In some examples, the trough 1326 defines a width slightly smaller than the width of the weighted material 12 so that the weighted material 12 is slightly compressed within the trough 1326 to ensure the weighted material 12 is retained by the pressure roller 36 until application to the flange 714 of the wheel 14. Upon the pressure roller 36 applying sufficient pressure to press the weighted material 12 against the flange 714 of the wheel 14, the adhesive 312 adheres to the flange 714 causing the weighted material 12 to release from the trough 1326 and attach to the flange 714 as the pressure roller 36 and the wheel 14 rotate in opposite directions. Additionally, the pressure roller 36 may be magnetized and the weighted material 12 may include one or more ferromagnetic materials such that a magnetic force attracts the weighted material 12 fed from the weight feed applicator 40c into the trough 1326 of the pressure roller 36 until attachment with the wheel-tire assembly 16 by the adhesive 312.

Figure 14A:
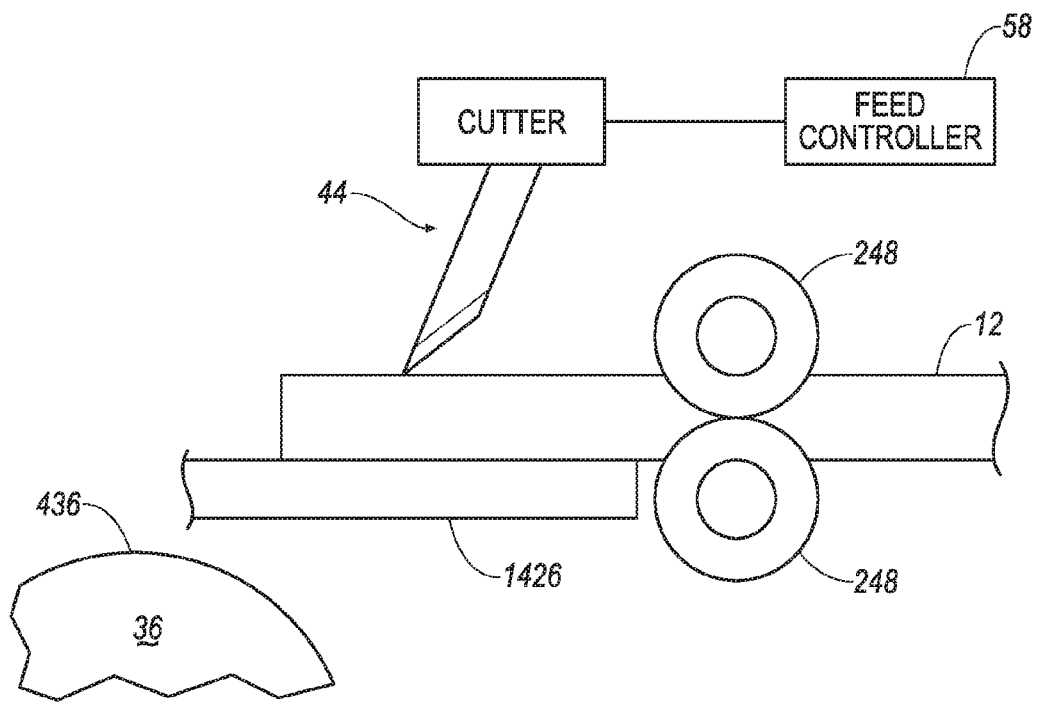
FIG. 14A is schematic view of a cutter including a plunging blade configured to chop a strip of weighted material into a segment for application upon an outer circumferential surface of a pressure roller.
Figure 14B:
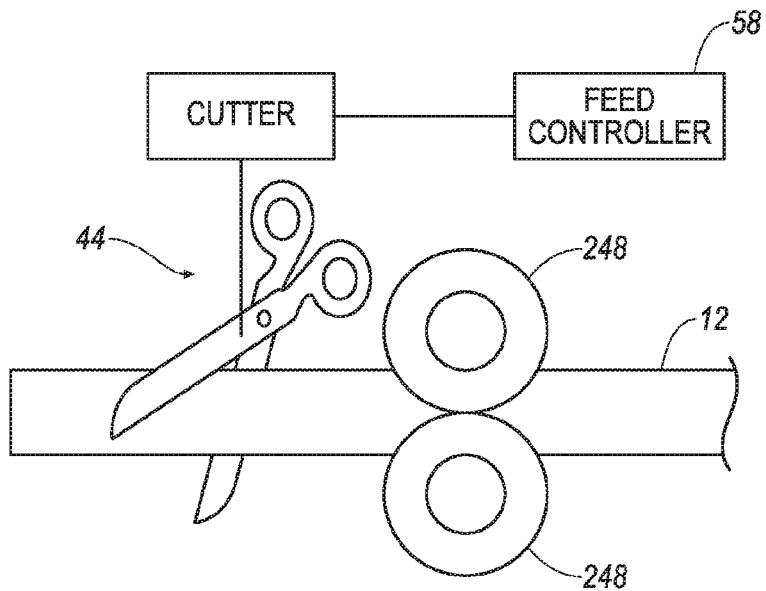
FIG. 14B is a schematic view of a cutter including a slicing blade configured to cut a strip of weighted material into a segment for application upon an outer circumferential surface of a pressure roller.

In some implementations, the cutter 44 is a plunging blade that cuts the weighted material 12 by chopping through the weighted material 12 in a guillotine fashion. In some examples, the outer circumference 436 of the pressure roller 36 is operative as a cutting surface for the cutter 44 to cut the weighted material 12. In other examples, as shown in FIG. 14A, an intermediate cutting surface 1426 disposed between the idler pulleys 248 and the pressure roller 36 is operative to provide the surface for the cutter 44 to cut against to thereby preserve the pressure roller 36. FIG. 14B provides another implementation of the cutter 44 including a slicing blade that moves relative to another blade to shear or slice the weighted material 12 into the segment having the prescribed length.

A number of implementations have been described. Nevertheless, it will be understood that various modifications may be made without departing from the spirit and scope of the disclosure. Accordingly, other implementations are within the scope of the following claims.

What is claimed is:

1. A system that applies a prescribed length of weighted material upon a wheel of a wheel-tire assembly comprising:
   a shaft defining a length extending between a proximal end and a distal end, wherein the distal end supports the wheel of the wheel-tire assembly for common rotation with the shaft about a longitudinal axis;
   an applicator assembly supported by the shaft and comprising:
      a base portion disposed upon the shaft and operable to translate axially along the length of the shaft;
      a radial portion connected to the base portion and operable to radially move relative to the base portion between a retracted position and an extended position; and
      a pressure roller rotatably supported by the radial portion about an axis of rotation, wherein the pressure roller is sized for supporting the prescribed length of weighted material; and
   a processor in communication with the shaft and the applicator assembly, wherein the processor is operable to control the pressure roller to transfer the prescribed length of the weighted material from the pressure roller to the wheel.

2. The system of claim 1, wherein the proximal end of the shaft is operably connected to a shaft motor in communication with the processor, the processor operable to control the shaft motor to rotate the shaft about the longitudinal axis when the pressure roller applies the prescribed length of the weighted material to the wheel.

3. The system of claim 1, further comprising:
   an axial actuator in communication with the processor and the base portion of the applicator assembly, the axial actuator operative to translate the base portion axially along the length of the shaft in a first direction to axially align the pressure roller with the wheel;
   a radial actuator in communication with the processor and the radial portion of the applicator assembly, the radial actuator operative to radially move the radial portion outward from the base portion when the pressure roller is axially assigned with the wheel to press the weighted material against the wheel; and
   a drive motor in communication with the processor and the pressure roller, the drive motor operative to rotate the pressure roller about the axis of rotation when the pressure roller receives the prescribed length of the weighted material and when the pressure roller applies the prescribed length of the weighted material to the wheel.

4. The system of claim 1 further comprising a weight feed assembly, wherein the weight feed assembly includes:
   a dispenser operative to advance a strip of the weighted material stored in a roll in a direction toward the pressure roller; and
   a cutter operative to cut the strip of the weighted material into a segment associated with the prescribed length of the weighted material.

5. The system of claim 4, wherein the dispenser comprises:
   a cylinder;
   a linear actuator operable to linearly translate in a first direction away from the cylinder during a power stroke within the cylinder and in an opposite second direction toward the cylinder; and
   a ratchet mechanism associated with the linear actuator and configured to engage with a portion of the length of the weighted material when the linear actuator translates in the first direction and disengage from the weighted material when the linear actuator translates in the second direction.

6. The system of claim 4, wherein the dispenser comprises:
   a spool configured to hold a roll of the weighted material;
   a take-up roller operatively coupled to the spool; and
   a rotational actuator operative to rotate the take-up roller to cause the weighted material to unwind from the spool and advance toward the applicator assembly.

7. The system of claim 1 further comprising a take-up roller operative to remove a backing from the prescribed length of weighted material to expose an adhesive material applied to the prescribed length of weighted material prior to arranging the prescribed length of weighted material upon the pressure roller.

8. The system of claim 7, wherein the adhesive material is configured to attach the prescribed length of the weighted material to the wheel.

9. The system of claim 1, wherein the wheel comprises a flange that receives the prescribed length of the weighted material from the pressure roller, wherein the flange extends from one of a rear face or a front face of the wheel.

10. The system of claim 1, wherein the wheel comprises an inner diameter defined by a radial wall, wherein the radial wall receives the prescribed length of the weighted material from the pressure roller, wherein the radial wall extends between a front face and a rear face of the wheel and circumscribes a central cavity.

11. The system of claim 1, wherein the weighted material comprises a continuous strip of high-density weight material having a substantially uniform cross-section.

12. The system of claim 1, wherein the weighted material defines a rope-shaped cross-section.

13. The system of claim 1, wherein the weighted material defines a ribbon-shaped cross-section.

14. The system of claim 1, wherein the axis of rotation of the pressure roller and the longitudinal axis of the shaft are convergent in a direction extending toward the distal end of the shaft.

15. The system of claim 1, wherein the axis of rotation of the pressure roller extends in a direction substantially parallel to the longitudinal axis of the shaft.

16. The system of claim 1, wherein said pressure roller is at least partially magnetic.

\* \* \* \* \*